United States Patent Office 3,822,307
Patented July 2, 1974

3,822,307
N-METHYL PHENYLCARBAMATES

Keimei Fujimoto, Kyoto, Taizo Ogawa, Iruma-gun, Yositosi Okuno and Katsuzo Kamoshita, Toyonaka, Shinji Nakai, Takarazuka, Norio Kotera, Amagasaki, and Kosuke Shigehiro, Nishinomiya, Japan, assignors to Sumitomo Chemical Co., Ltd.
No Drawing. Continuation of abandoned application Ser. No. 762,997, Sept. 26, 1968. This application Feb. 29, 1972, Ser. No. 230,509
Int. Cl. C07c 125/06
U.S. Cl. 260—479 C      3 Claims

ABSTRACT OF THE DISCLOSURE

A carbamate compound of the formula:

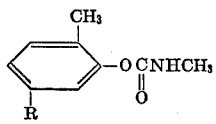

wherein R is sec.-butyl or tert.-butyl, which is prepared by reacting a hydroxyl compound of the formula:

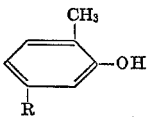

wherein R is as defined above with phosgene and then reacting the resultant carbonyl chloride compound with methylamine or by reacting the said hydroxyl compound with methyl isocyanate. The carbamate compound is useful as an insecticidal agent of high safety.

---

This application is a continuation of copending application Ser. No. 762,997, filed Sept. 26, 1968, now abandoned.

The present invention relates to novel carbamate compounds, and their use and production.

The said carbamate compounds are representable by the formula:

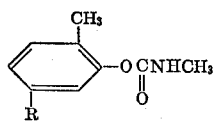

wherein R is sec.-butyl or tert.-butyl. Thus, the term "carbamate compound(s)" herein used is intended to mean 2 - methyl - 5 - sec.-butylphenyl N-methylcarbamate and 2-methyl-5-tert.-butylphenyl N-methylcarbamate, inclusively.

Hitherto, it has been known that 2-methyl-5-isopropylphenyl N-methylcarbamate and 2-methyl-5-ethylphenyl N-methylcarbamate have certain insecticidal activity [J. Agr. Food Chem., vol. 13, 226 (1965)]. However, their insecticidal activity is not so strong that their practical application is incited. Further, their toxicity on plants, animals and human beings is relatively high.

It has now been found that the said carbamate compounds [I] exert marked insecticidal activity against insect pests, particularly in agriculture and household, with high safety to plants, animals and human beings.

Accordingly, a basic object of the present invention is to embody the novel carbamate compounds [I]. Another object of this invention is to embody the carbamate compounds [I] having insecticidal activity. A further object of the invention is to embody an insecticidal composition comprising as an active ingredient at least one of the carbamate compounds [I]. A still further object of the invention is to embody a process for preparing the carbamate compounds [I]. These and other objects will be apparent to those conversant with the art to which the present invention pertains from the subsequent description.

In accordance with the present invention, the carbamate compounds [I] may be prepared by the procedure as shown in the following scheme:

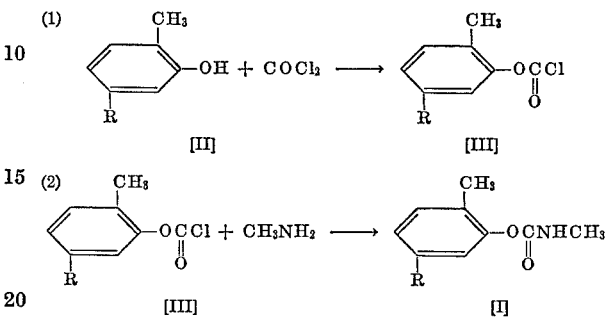

wherein R is as defined above. The reaction (1) is executed by treating the hydroxyl compound [II] with phosgene in the presence of an acid-eliminating agent (e.g. sodium hydroxide, potassium hydroxide, dimethylaniline, diethylaniline, triethylamine, pyridine), ordinarily in a solvent (e.g. benzene, toluene, chlorobenzene, ethyl ether) at a temperature from about —10° C. to about 30° C. The reaction (2) is effected by treating the carbonyl chloride compound [III] with methylamine in the presence of an acid-eliminating agent (e.g. sodium hydroxide, potassium hydroxide, dimethylaniline, diethylaniline, triethylamine, methylamine, pyridine), normally in a solvent (e.g. water, benzene, toluene, chlorobenzene, ethyl ether) at a temperature from about —10° C. to about 40° C.

Alternatively, the carbamate compounds [I] may be also prepared by the procedure as shown in the following scheme:

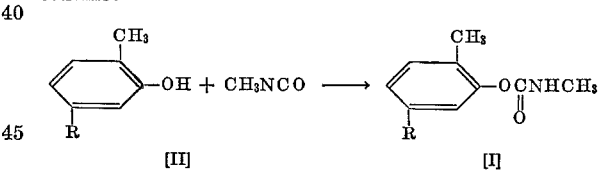

wherein R is as defined above. The reaction is carried out by treating the hydroxyl compound [II] with methyl isocyanate, preferably in a solvent (e.g. benzene, toluene, chlorobenzene, ethyl ether) at a temperature from about 10° C. to about 80° C.

The carbamate compounds [I] exhibit highly appreciable insecticidal action on various insect pests including leafhopper, planthopper, aphid, scale, bug, moth, leaf worm, bagworm, leaf-roller, leaf-miner, caterpillar, stem borer, midge, maggot, fly, weevil, beetle, mite, etc. Some of the test results by which the insecticidal activity of the carbamate compounds [I] is evidenced are shown below.

TEST 1

Rice plants (15 to 20 cm. toll) elapsed 15 days after emergence were immersed for 1 minute in a 20,000 or 40,000 dilution of 10% emulsion of the carbamate compound [I] prepared as in Example 2(A) hereinafter described and dried in atmosphere. The dried rice plants were admitted in a large test tube, 30 smaller brown planthoppers (*Laodelphax striatellus*) were introduced therein and the test tube was covered by a gauze. After 24 hours, the percent death was calculated. For comparison, the similar test was also carried out using 20,000 and 40,000 fold dilutions of 10% emulsion of 1-naphthyl N-methylcarbamate and of malathion. The results are shown in Table I.

TABLE 1

| Test compound | Dilution (fold) | Percent death |
|---|---|---|
| 2-methyl-5-sec.-butylphenyl N-methylcarbamate | 20,000 | 100 |
|  | 40,000 | 100 |
| 2-methyl-5-tert.-butylphenyl N-methylcarbamate | 20,000 | 100 |
|  | 40,000 | 90 |
| 1-naphthyl N-methylcarbamate | 20,000 | 100 |
|  | 40,000 | 95 |
| Malathion | 20,000 | 100 |

TEST 2

A 4,000 fold dilution of 30% wettable powder of the carbamate compound [I] prepared as in Example 2(B) hereinafter described was sprayed on cowpeas (*Vigna sinensis*) parasitized by tow spotted spider mite (*Tetranychus urticae*) at a rate of 10 ml. per plant. After 48 hours, all mites were dead.

TEST 3

Rice plants elapsed 70 days after seeding were transplanted in 1/50,000 Wagner pots, a designed amount of 5% dust, of the carbamate compound [I] prepared as in Example 2(C) hereinafter described was applied on the rice plants by the use of a bell jar duster and 30 brown planthoppers (*Nilaparvata lugens*) were released thereto. After 24 hours, the percent death was calculated. For comparison, the similar test was also carried out using 5% dust of 1-naphthyl N-methylcarbamate and of "Sumithion" [Trademark for O,O-dimethyl O-(3-methyl-4-nitrophenyl)thiophosphate manufactured by Sumitomo Chemical Co., Ltd., Japan]. The results are shown in Table 2, in which the numerals are the average of the values about 3 pots.

TABLE 2

| Test compound | Applied amount of dust (mg./pot) | Percent death |
|---|---|---|
| 2-methyl-5-sec.-butylphenyl N-methylcarbamate | 500 | 100 |
|  | 280 | 100 |
|  | 130 | 85 |
|  | 70 | 63.2 |
|  | 40 | 51.4 |
| 2-methyl-5-tert.-butylphenyl N-methylcarbamate | 500 | 100 |
|  | 280 | 100 |
|  | 130 | 67.4 |
|  | 70 | 40.7 |
|  | 40 | 15.1 |
| 1-naphthyl N-methyl-carbamate | 500 | 100 |
|  | 280 | 95 |
|  | 130 | 73.2 |
|  | 70 | 30.5 |
|  | 40 | 11.3 |
| Sumithion | 500 | 100 |
|  | 280 | 98.2 |
|  | 130 | 68.0 |
|  | 70 | 52.0 |
|  | 40 | 10.8 |

TEST 4

Into each one liter-beaker filled with water, granules of the carbamate compound [I] prepared as in Example 2(D) hereinafter described were added to make 2 p.p.m. of the active compound, and 50 larvae of mosquito (*Cule pipiens pallens*) were released therein. After 24 hours, the percent death was calculated. For comparison, the similar test was also carried out using 2 p.p.m. of 1-naphthyl N-methylcarbamate and of "Sumithion." The results are shown in Table 3.

TABLE 3

| Test compound | Death (percent) |
|---|---|
| 2-Methyl - 5 - sec.-butylphenyl N-methylcarbamate | 100 |
| 2-Methyl - 5 - tert.-butylphenyl N-methylcarbamate | 95 |
| 1-Naphthyl N-methylcarbamate | 98 |
| Sumithion | 100 |

Further, the carbamate compounds [I] are quite less toxic than the known insecticidal compounds structurally similar thereto. The acute toxicity of the carbamate compounds [I] when orally administered to male mice is shown in Table 4, compared with that of 2-methyl-5-isopropylphenyl N-methylcarbamate and of 2-methyl-5-ethylphenyl N-methylcarbamate.

TABLE 4

| Test compound | Acute toxicity (mg./kg.) |
|---|---|
| 2 - Methyl-5-sec.-butylphenyl N-methylcarbamate | >>400 |
| 2 - Methyl-5-tert.-butylphenyl N-methylcarbamate | >>400 |
| 2-Methyl-5-isopropylphenyl N-methylcarbamate | 21 |
| 2-Methyl-5-ethylphenyl N-methylcarbamate | 25 |

As ensured by these and other test results, the carbamate compounds [I] are useful for combating various insect pests, particularly in agriculture and household, with high safety to human beings.

For the insecticidal use, the carbamate compound [I] is normally extended with an inert carrier(s) to make a preparation form conventionally employed for insecticides such as emulsion, wettable powder, solution, dust, aerosol, painting, bate or the like. When the preparation is emulsion or wettable powder, the active compound may be contained in 5 to 80% by weight. In the case of solution, dust or aerosol, the content of the active compound may be from 0.1 to 50% by weight. Examples of the inert carrier are talc, clay, bentonite, kaolin, diatomaceous earth, pyrophyllite, benzene, toluene, dimethylnaphthalene, aromatic naphtha, etc. Surfactants may be also used as spreaders or emulsifiers. When desired, there may be further incorporated other insecticidal agents such as chlorinated hydrocarbons (e.g. DDT, methoxychlor, benzene hexachloride, chlordane, toxaphene, heptachlor, aldrin, endrin), organic phosphorus compounds (e.g. parathion, malathion, demeton, tetraethyl pyrophosphate) and pyrethroids (e.g. pyrethrin, allethrin, furethrin, barthrin), miticides, nematocides, germicides, herbicides, fertilizers, soil disinfectants and the like.

Practical embodiments of the present invention are illustratively shown in the following examples. In these examples, parts are by weight.

EXAMPLE 1

(A) Preparation of 2-methyl-5-sec.-butylphenyl N-methylcarbamate: To a solution of 2-methyl-5-sec.-butylphenol (16.4 g.) in isopropyl ether (50 ml.), there are added methyl isocyanate (6.84 g.) and triethylamine (trace). The reaction proceeds with generation of heat. The reaction mixture is allowed to cool. The precipitate is collected by filtration and recrystallized from benzene to give the objective compound (17.9 g.) as colorless crystals melting at 96 to 101° C.

(B) Preparation of 2-methyl-5-tert.-butylphenyl N-methylcarbamate: To a solution of 2-methyl-5-tert.-butylphenol (16.4 g.) in isopropyl ether (50 ml.), there are added methyl isocyanate (6.84 g.) and triethylamine (trace). The reaction proceeds with generation of heat. The reaction mixture is treated as in Example 1 to give the objective compound (18.6 g.) as colorless crystals melting at 126.5 to 128° C.

(C) Preparation of 2-methyl-5-tert.-butylphenyl N-methylcarbamate: To a solution of phosgene (14.9 g.) in benzene (100 ml.), there is dropwise added a mixture of 2-methyl-5-tert.-butylphenol (16.4 g.) and pyridine (8.3 g.) at 5 to 10° C. The reaction mixture is washed with water (50 ml.) twice. To the separated organic phase, 30% aqueous solution of monomethylamine (21 g.) is dropwise added at 5 to 10° C. The precipitate is collected by filtration, washed with water and dried at 50° C. in vacuo. The resulting material is recrystallized from benzene to give the objective compound (16.8 g.) as colorless crystals melting at 127 to 128° C.

EXAMPLE 2

(A) Emulsion preparation: The carbamate compound [I] (10 parts), N,N-dimethylformamide (40 parts), "Kawakasol" [Trademark for aromatic solvent mainly containing α-methylnaphthalene manufactured by Kawasaki Kasei Co., Ltd., Japan] (30 parts) and "Sorpol 9049" [Trademark for surfactant manufactured by Toho Chemical Co., Ltd., Japan] (20 parts) are mixed thoroughly in this order to make 10% emulsion. The emulsion is diluted with water and then applied.

(B) Wettable powder preparation: The carbamate compound [I] (30 parts), "Tokusil GU-N" [Trademark for silica manufactured by Tokuyama Soda Co., Ltd., Japan] (5 parts), "Radiolite" [Trademark for diatomaceous earth manufactured by Showa Kagaku Co., Ltd., Japan] (60 parts) and "Sorpol 5029" [Trademark for surfactant manufactured by Toho Chemical Co., Ltd., Japan] (5 parts) are mixed thoroughly in this order to make 30% wettable powder. The wettable powder is diluted with water and then applied.

(C) Dust preparation: The carbamate compound [I] (5 parts) and talc (95 parts) are mixed thoroughly and pulverized to make 5% dust. The dust is applied as such.

(D) Granule preparation: The carbamate compound [I] (4 parts), sodium ligninsulfonate (2 parts) and 200 mesh clay (94 parts) are mixed thoroughly in this order, kneaded with a small amount of water, granulated and then dried to make granules. The granules are applied as such.

What is claimed is:

1. A carbamate compound of the formula:

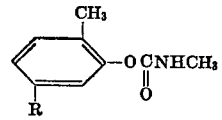

wherein R is sec.-butyl or tert.-butyl.

2. The carbamate compound according to claim 1, in which R is sec.-butyl, i.e. 2-methyl-5-sec.-butylphenyl N-methylcarbamate.

3. The carbamate compound according to claim 1, in which R is tert.-butyl, i.e. 2-methyl-5-tert.-butylphenyl N-methylcarbamate.

References Cited

Kolbezen et al.: J. Ag. & Food Chem. (1954), vol. 2, pp. 864–70.

Hadaway et al.: World Health Organ. Bull. (1965), vol. 32, pp. 581–5.

JAMES A. PATTEN, Primary Examiner

U.S. Cl. X.R.

260—463; 424—300